(12) United States Patent
Huggett et al.

(10) Patent No.: US 6,201,715 B1
(45) Date of Patent: Mar. 13, 2001

(54) SYNCHRONOUS FRAME REGULATION TO EXTRACT A POSITIVE SEQUENCE COMPONENT OF A LINE VOLTAGE

(75) Inventors: Colin Huggett, Torrance; Gabor Kalman, Palos Verdes, both of CA (US)

(73) Assignee: Honeywell International Inc., Norristown, NJ (US)

( * ) Notice: Subject to any disclaimer, the term of this patent is extended or adjusted under 35 U.S.C. 154(b) by 0 days.

(21) Appl. No.: 09/536,373

(22) Filed: Mar. 28, 2000

(51) Int. Cl.[7] .................................................. H02M 1/12
(52) U.S. Cl. .............................. 363/48; 363/89; 307/105
(58) Field of Search ................................ 363/48, 44, 39, 363/89, 84; 307/105

(56) References Cited

U.S. PATENT DOCUMENTS

| | | | |
|---|---|---|---|
| 5,428,283 | * | 6/1995 | Kalman et al. ................. 318/729 |
| 5,883,796 | | 3/1999 | Cheng et al. ..................... 363/40 |
| 5,949,204 | * | 9/1999 | Huggett et al. ................. 318/254 |

* cited by examiner

*Primary Examiner*—Shawn Riley
(74) *Attorney, Agent, or Firm*—William J. Zak, Jr., Esq.

(57) ABSTRACT

A power distribution system includes an active rectifier and a controller for the active rectifier. The controller extracts a positive sequence component of a Park vector representing line voltage; and uses the positive sequence component to perform synchronous frame regulation to control the active rectifier.

20 Claims, 4 Drawing Sheets

SYNCHRONOUS FRAME REGULATION TO EXTRACT A POSITIVE SEQUENCE COMPONENT OF A LINE VOLTAGE

BACKGROUND OF THE INVENTION

The present invention relates to power distribution systems. More specifically, the present invention relates to synchronous frame regulation in a power distribution system.

It is not unusual for a power distribution system to have a three-phase distribution feeder that supplies multiple loads. However, different loads connected to the feeder can cause the line voltage to become unbalanced. The voltage is considered unbalanced if the line-to-line voltages are not equal. For instance, consider a situation when a three-phase motor and a single-phase load are connected to a distribution feeder line. If the three-phase motor and the single-phase load are operated at the same time, a voltage unbalance on the feeder line will occur.

When an unbalanced voltage is applied to an active rectifier, control algorithms used to regulate the active rectifier can cause third harmonic current to be generated in the power distribution system. These currents are extremely undesirable, partly because they affect the active rectifier's control and partly because they can cause overheating of the loads that receive power from the distribution system.

SUMMARY OF THE INVENTION

These problems are overcome by the present invention. According to one aspect of the invention, a system comprises a distribution feeder line; an active rectifier connected to the distribution line; and a controller for controlling the active rectifier. The controller extracts the positive sequence component of a Park vector representing the line voltage (which may contain both positive and negative sequence components), and utilizes the extracted positive sequence component to perform synchronous frame regulation to control the active rectifier. Using the positive sequence component can prevent low frequency harmonic currents from being generated in the power distribution system.

DETAILED DESCRIPTION OF THE INVENTION

Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Figure 1:
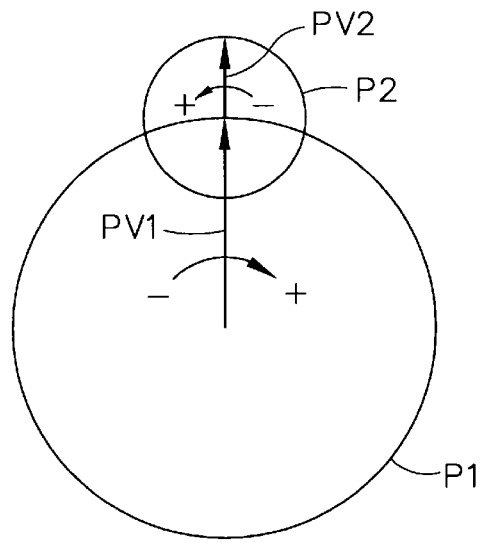
FIG. 1 is an illustration of two counter-rotating Park vectors that represent an unbalanced voltage.

FIG. 1 shows two counter-rotating Park vectors that together represent an unbalanced load that creates an unbalanced voltage. The first Park vector, which is denoted as PV1, rotates clockwise, and it represents a balanced three phase load plus the clockwise rotating portion of a single-phase load. The second Park vector, which is denoted as PV2, represents the counter-clockwise rotating portion of a single-phase load. (Note that the Park vectors of single-phase loads can be represented as two equal magnitude counter-rotating vectors). The locus of the first Park vector P1 is a first circle, and the locus of the second Park vector P2 is a second circle.

Figure 2:
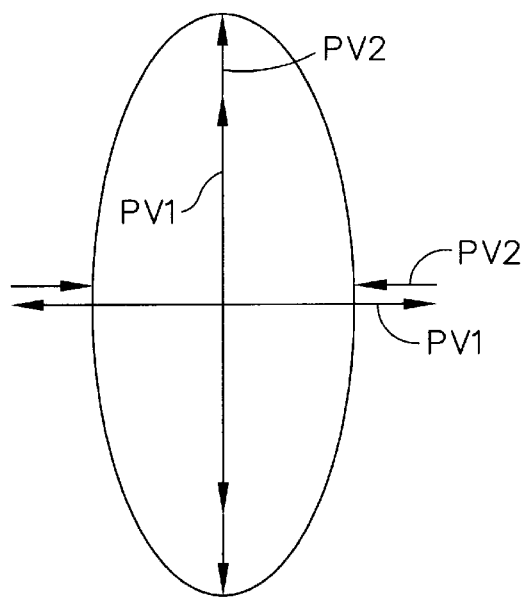
FIG. 2 is an illustration of the locus of the vectorial sum of the two Park vectors.

FIG. 2 shows the locus of the vectorial sum of the two counter-rotating Park vectors PV1 and PV2. The locus of the vectorial sum is an ellipse. The first Park vector PV1 corresponds to the positive sequence component of the line voltage, and the second Park vector PV2 corresponds to the negative sequence of the line voltage. A major axis of the ellipse is formed when the vectors PV1 and PV2 are lined up in the same direction, and a minor axis is formed when the vectors PV1 and PV2 are lined up in opposite directions. The alignment of the positive and negative sequence components corresponds to a quarter cycle of the fundamental frequency.

Figure 3:
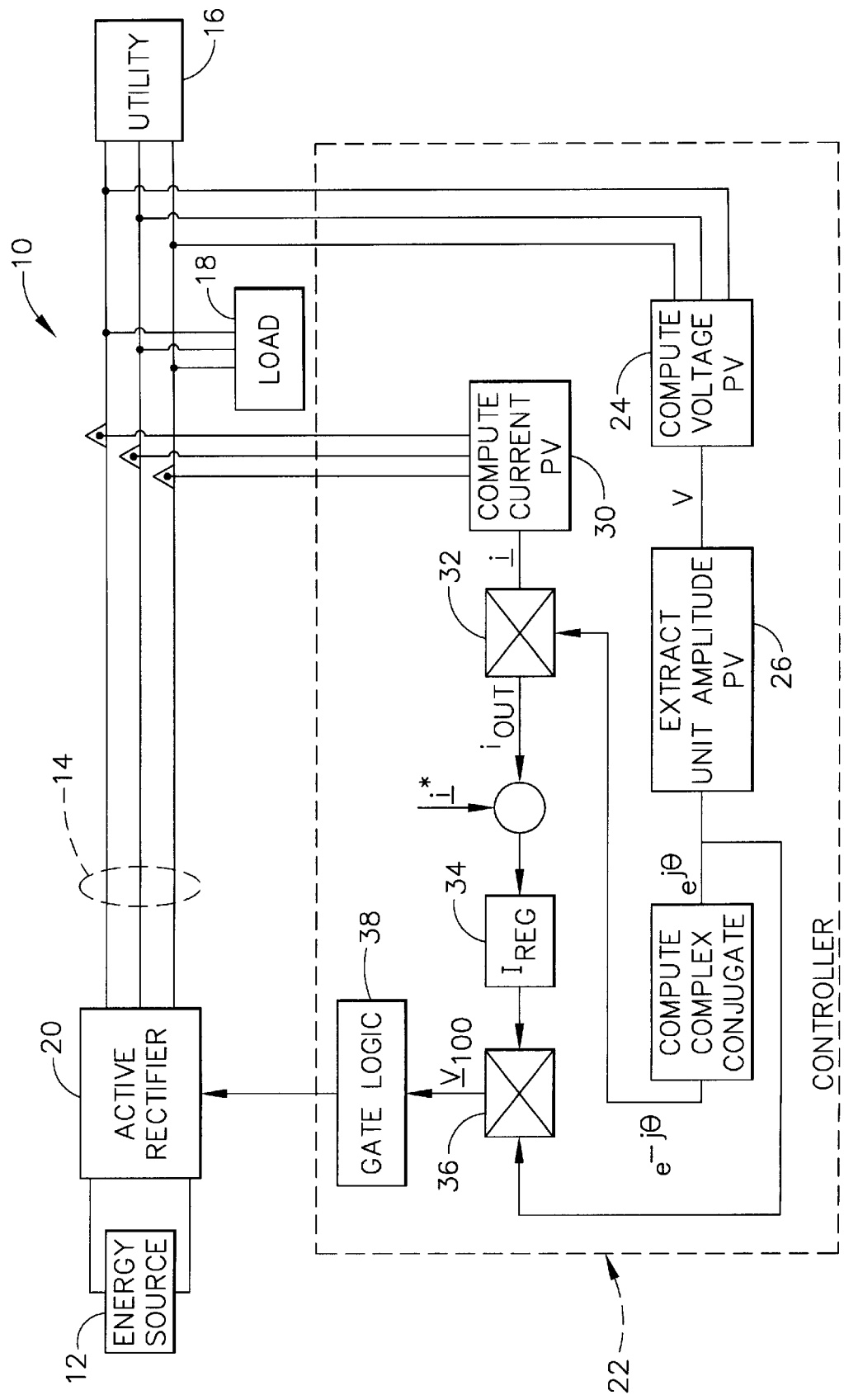
FIG. 3 is an illustration of a power distribution system including a controller according to the present invention.

FIG. 3 is an illustration of a three-phase power distribution system 10 including an energy sink/source 12, a distribution feeder line 14, and an interconnected utility 16 (e.g., a power company). A balanced or unbalanced load 18 (e.g., the combination of a three-phase induction motor and a single phase load such as a lighting load) is coupled to the energy sink/source 12 via the distribution line 14, and an active rectifier 20 is coupled to the energy sink/source 12 via the distribution line 14. The active rectifier 20 is a type of power converter than can convert ac power to dc power and dc power to ac power in a bi-directional manner. Thus power flow on the distribution line 14 may be bi-directional.

The system 10 further includes a controller 22 that performs synchronous frame regulation to control the active rectifier 20. The synchronous frame regulation may be performed as follows. Line voltages are used to compute a voltage Park vector $\underline{v}$ (block 24), and an associated unit amplitude Park vector, $e^{j\theta}$, extracted from the voltage Park vector $\underline{v}$ (block 26). The unit amplitude Park vector is represented by a complex number in polar coordinates (or as a+ib in Cartesian coordinates) from which the complex conjugate, $e^{-j\theta}$, of the unit amplitude Park vector is determined (block 28). A current Park vector $\underline{i}$ is also computed from line currents (block 30).

A vector product of the current Park vector $\underline{i}$ and the complex conjugate $e^{-j\theta}$ of the unit amplitude Park vector is taken to convert the current Park vector $\underline{i}$ from a stationary or natural frame of reference into a synchronous frame of reference (block 32). The latter frame is synchronous with respect to the voltage Park vector $\underline{v}$. The vector resulting from the vector product is subtracted from a current command i* (also defined in the synchronous frame) and the resulting error vector is then amplified and/or regulated through a regulator (block 34). The current command i* may be derived from a higher level control loop (e.g., power transfer, speed of a machine), which is usually application-specific.

The error vector is then converted back into the stationary reference frame by taking a product of the regulated error signal and the unit amplitude Park vector, $e^{j\theta}$ (block 36). The vector $v_{100}$ resulting from this product is supplied to gate logic 38. The gate logic 38 uses the vector $v_{100}$ to turn on and off power switches of the active rectifier 20. The controller 22 may be a hardware implementation, a software implementation, or a combination of the two.

The voltage on the line 14 may be unbalanced. An unbalanced line voltage may be characterized as the summation of two balanced sequence components: a positive sequence component and a negative sequence component.

If the line voltage is unbalanced and the negative sequence component is not removed from the unit amplitude Park vector, $e^{j\theta}$, the negative sequence component will cause third harmonic frequency line currents to be generated. The magnitude of the third harmonic current is a function of the amplitude of the negative sequence component. Specifically, if the line voltage contains a negative sequence component and the coordinate transformation (from stationary reference frame to synchronous reference frame) is derived from the measured voltage and is used in the control algorithms, the angle associated with the such coordinate transformation will not increase linearly in time. Consequently, low harmonic frequency currents will be generated.

Figure 4:
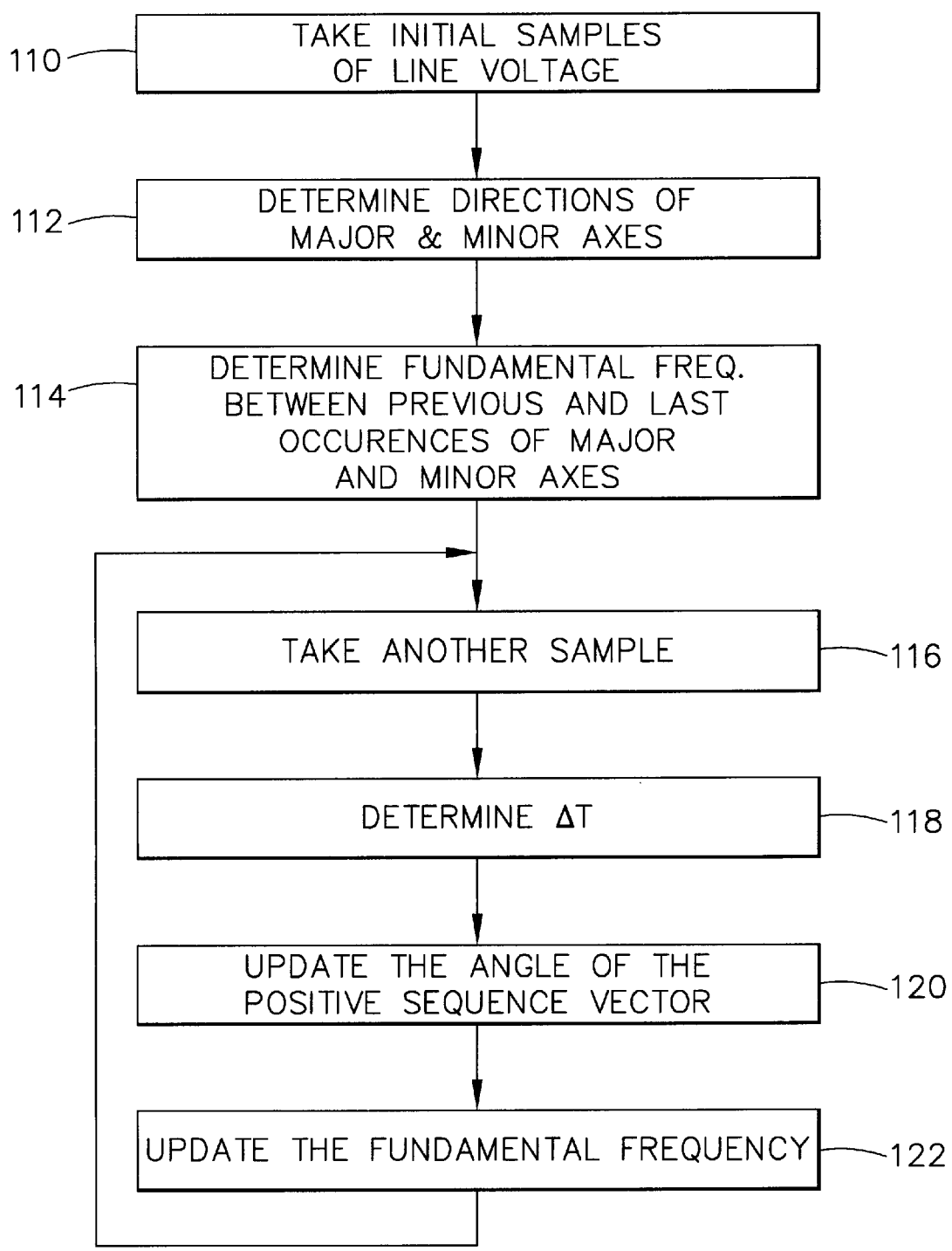
FIG. 4 is an illustration of a first method of extracting a unit amplitude Park vector, the first method being performed by the controller.
Figure 7:
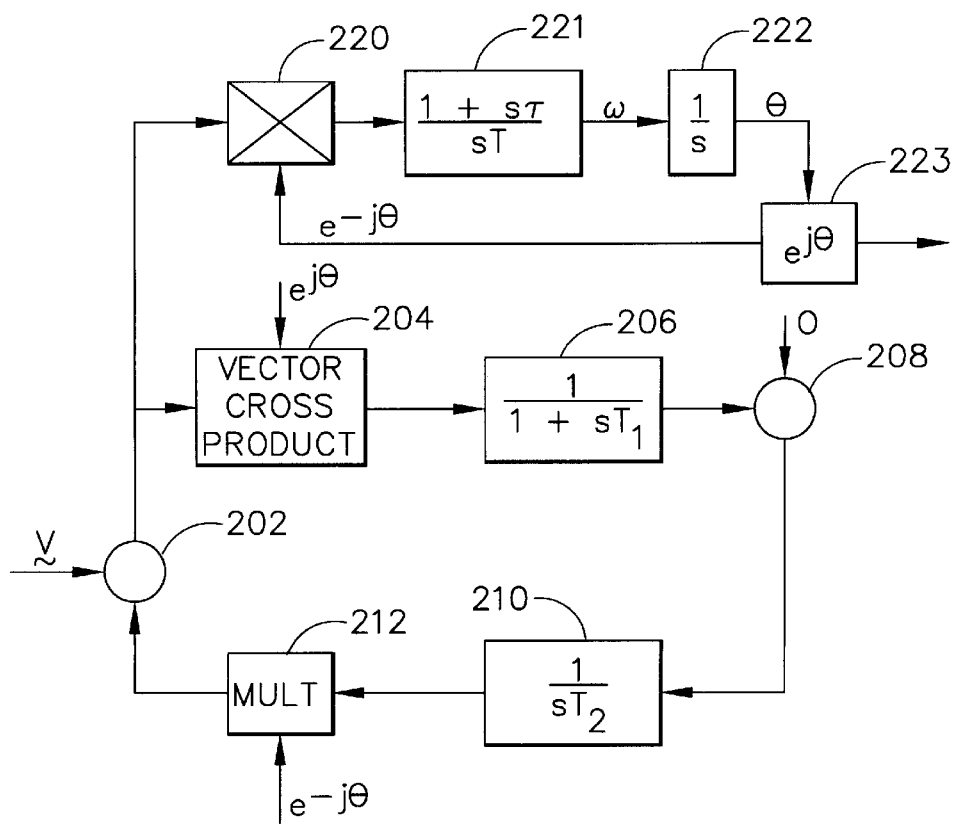
FIG. 7 is an illustration of a second method of extracting a unit amplitude Park vector, the second method being performed by the controller.

However, if the block 26 of the controller 22 extracts the positive sequence component of a unit amplitude Park vector representing the line voltage, and the controller 22 uses only the positive sequence component to perform synchronous frame regulation, then the low harmonic frequency currents will not be generated or will be maintained at an acceptable level. A first method of extracting the positive sequence component is illustrated in FIG. 4. A second method is illustrated in FIG. 7.

Reference is now made to FIG. 4. The line voltage is sampled at a rate that is compatible with the switching or modulation frequency of the power switches in the active rectifier (usually about 10 kHz to 20 kHz). Sufficient data to represent at least one quarter of a complete cycle at the fundamental frequency is taken.

Figure 5:
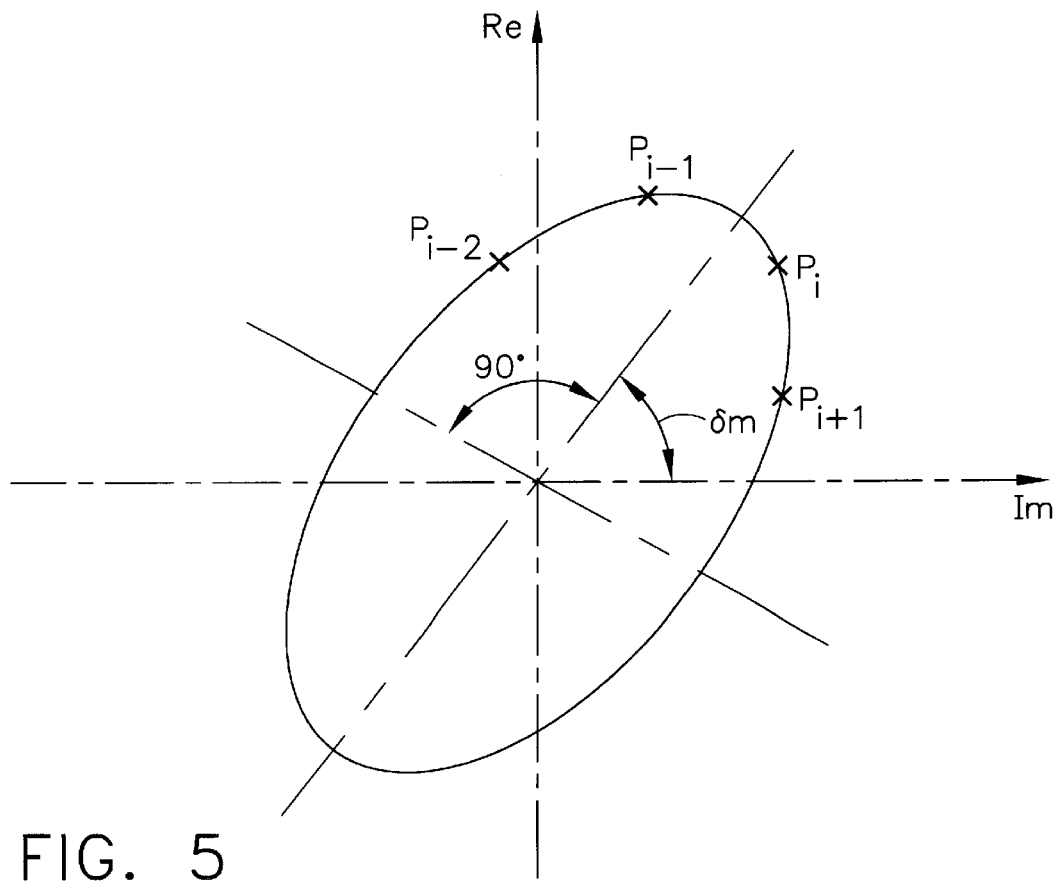
FIG. 5 is an illustration of sample points lying on a locus of the vectorial sum of the two counter-rotating Park vectors.

The positive sequence is initially determined by taking at least four consecutive samples of the line voltage (block 110). The controller may use a quadratic interpolation routine to determine the major and minor axes of the ellipse from the initial samples (block 112). The quadratic interpolation routine may also be used to determine the direction (angle $\alpha_m$) of the major and minor axes. Interpolation of the major and minor axes from four initial samples Pi+1, Pi, Pi−1 and Pi−2 is illustrated in FIG. 5.

The fundamental frequency (F) of the positive sequence may then be established from the time difference between the previous and last occurrences of the major and minor axes (block 114). This time difference corresponds to a 90 degree section of the fundamental frequency period.

After each additional sample is taken (block 116), the time ($\Delta T$) that has elapsed since the occurrence of the last major or minor axis is determined (block 118). The elapsed time $\Delta T$ includes the sum of (1) an integer multiple of the sample period; and (2) an estimated fraction of the update period that followed the occurrence of the last major or minor axis.

The angle of the positive sequence vector PV1 at the update point $P_{i+1}$ may be determined (block 120) as follows:

$$\alpha_{i+1}=\alpha_m+90°(\Delta T)F$$

Figure 6:
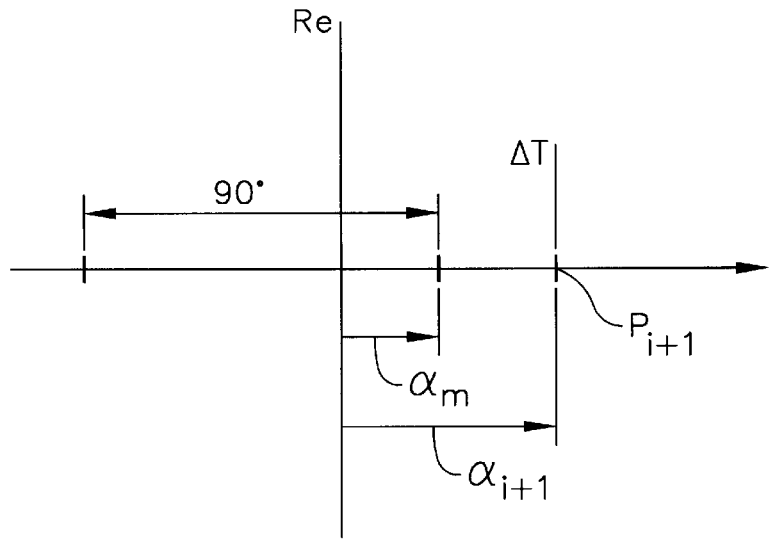
FIG. 6 is an illustration of updating an angle derived from a positive sequence component of the vectorial sum.

Determining the angle $\alpha_{i+1}$ corresponding to the (i+1)-th sample is illustrated in FIG. 6.

The amplitude (dc content) of the positive sequence component does not change over time; only the angle does. Thus, by updating the angle at discrete intervals, the controller provides the positive sequence component at discrete intervals.

The fundamental frequency F may also be updated after each sample is taken (block 122). In the alternative, the fundamental frequency may be updated at each 90 degree interval.

Reference is now made to FIG. 7, which illustrates the second method of extracting the positive sequence component of the unit amplitude Park vector. The controller measures the locus of the voltage Park vector $\underline{v}$ and varies the locus—in a closed-loop fashion—until the locus becomes a circle. The positive sequence is extracted continuously.

The controller extracts the unit amplitude Park vector from the voltage Park vector $\underline{v}$ by taking a cross product of the voltage Park vector $\underline{v}$ and a complex conjugate of the unit amplitude Park vector (block 220). It then filters the result of the cross product (block 221) to obtain a frequency of the voltage Park vector, w, and then integrates the frequency (block 222) to determine the angle θ of the Park vector. The unit amplitude Park vector, $e^{j\theta}$, is then formulated from this angle θ (block 223) and used for the synchronous frame regulation.

As the unit amplitude Park vector, $e^{j\theta}$, is being extracted, the controller continuously corrects the voltage Park vector to eliminate its negative sequence component. A first transform block 204 computes the vector cross product of the voltage Park vector $\underline{v}$ and the negative sequence unit vector, $e^{j+}$, which is the complex conjugate of the unit amplitude Park vector.

The result of the cross product is supplied to a low pass filter 206, which eliminates high frequency content and leaves only a dc value. The dc value represents the negative sequence in the negative sequence reference frame. The dc value is then compared to a zero reference by a summing junction 208. The result of the comparison is an error signal which is integrated by an integrator 210. The integrator 210 functions as a closed loop regulator.

The output of the integrator 210 is converted back into a stationary reference frame by a second transform block 212, which performs a synchronous-to-stationary reference frame transformation. The result of this product is the negative sequence component of the voltage Park vector $\underline{v}$. A summing junction 202 corrects the voltage Park vector $\underline{v}$ by removing the negative sequence component from the voltage Park vector $\underline{v}$. The voltage Park vector $\underline{v}$ is corrected continuously.

The controller is not limited to the specific embodiments described above (for example, the controller may perform synchronous frame regulation in ways other than the way shown in FIG. 1). Instead, the invention is construed according to the claims that follow.

What is claimed is:

1. Apparatus for a power distribution system, the system including a distribution feeder line, the apparatus comprising:
    an active rectifier; and
    a controller for the active rectifier, the controller determining a positive sequence component of a Park vector representing line voltage, and using the positive sequence component to perform synchronous frame regulation.

2. The apparatus of claim 1, wherein the controller samples the line voltage, samples lying on a locus of the Park vector; predicts major and minor axes of the locus of the Park vector; and extracts a positive sequence from the major and minor axes.

3. The apparatus of claim 2, wherein the controller initially determines angle of the positive sequence from the major and minor axes; and wherein the angle is updated at discrete intervals.

4. The apparatus of claim 3, wherein the controller updates the angle ($\alpha_{i+1}$) by $\alpha_{i+1}=\alpha_m+90° (\Delta T)F$, where F is the fundamental frequency of the positive sequence, $\Delta T$ is the time between samples, and $\alpha_m$ is the angle of one of the major and minor axes.

5. The apparatus of claim 2, wherein the controller updates the fundamental frequency at regular intervals.

6. The apparatus of claim 2, wherein the controller predicts the major and minor axes from at least four samples of the line voltage.

7. The apparatus of claim 1, wherein the controller measures a locus of the Park vector and varies the locus until the locus becomes circular, the positive sequence being a vector defined by the circular locus.

8. The apparatus of claim 7, wherein the controller extracts a unit amplitude Park vector from a voltage Park vector, computes a vector cross product of the voltage Park vector $\underline{v}$ and a negative sequence unit vector, determines a negative sequence in a negative sequence reference frame from the vector cross product, performs a synchronous-to-stationary reference frame transformation, the result of the transformation being a negative sequence component of the voltage Park vector, and removes the negative sequence component from the voltage Park vector; whereby the positive sequence component of the voltage Park vector remains.

9. A controller for an active rectifier of a power distribution system, the power distribution system having a distribution feeder line, the controller comprising:

first means for taking samples of line voltage, the samples lying on a locus of a Park vector representing the line voltage;

second means for predicting major and minor axes of the locus of the Park vector; and third means for extracting a positive sequence component from the major and minor axes.

10. The controller of claim 9, wherein angle of the positive sequence is initially determined from the major and minor axes; and wherein the angle is updated at discrete intervals.

11. The controller of claim 10, wherein the angle ($\alpha_{i+1}$) is updated by $\alpha_{i+1}=\alpha_m+90° (\Delta T)F$, where F is the fundamental frequency of the positive sequence, $\Delta T$ is the time between samples, and $\alpha_m$ is the angle of one of the major and minor axes.

12. The controller of claim 11, wherein the fundamental frequency is updated at regular intervals.

13. The controller of claim 9, wherein the major and minor axes are predicted from at least four samples of the line voltage.

14. A controller for an active rectifier of a power distribution system, the power distribution system having a distribution feeder line, the controller comprising:

first means for extracting a unit amplitude Park vector from a voltage Park vector representing the line voltage;

second means for computing a vector cross product of the voltage Park vector and a negative sequence unit vector;

third means for determining a negative sequence in a negative sequence reference frame from the vector cross product;

fourth means for performing a synchronous-to-stationary reference frame transformation on the negative sequence reference frame, the result of the transformation being a negative sequence component of the voltage Park vector; and fifth means for removing the negative sequence component from the voltage Park vector.

15. A method of controlling an active rectifier for a power distribution system, the distribution system including a distribution feeder line, the method comprising the steps of:

determining a positive sequence component of a Park vector representing line voltage; and using the positive sequence component to perform synchronous frame regulation to control the active rectifier.

16. The method of claim 15, wherein the positive sequence is determined by taking samples of the line voltage, the samples lying on a locus of the Park vector; predicting major and minor axes of the locus of the Park vector; and extracting a positive sequence from the major and minor axes.

17. The method of claim 16, wherein an angle of the positive sequence is initially determined from the major and minor axes; and wherein the angle is updated at discrete intervals.

18. The method of claim 17, wherein the angle ($\alpha_{i+1}$) is updated by ($\alpha_{i+1}=\alpha_m+90° (\Delta T)F$, where F is the fundamental frequency of the positive sequence, $\Delta T$ is the time between samples, and $\alpha_m$ is the angle of one of the major and minor axes.

19. The method of claim 18, wherein the fundamental frequency is updated at regular intervals.

20. The method of claim 15, wherein the positive sequence is determined by extracting a unit amplitude Park vector from a voltage Park vector representing line voltage; computing a vector cross product of the voltage Park vector and a negative sequence in a negative sequence reference frame unit vector; determining a negative sequence reference frame from the vector cross product, using the negative sequence to determine a negative sequence component of the voltage Park vector; and removing the negative sequence component from the voltage Park vector.

* * * * *